(12) United States Patent
Zander et al.

(10) Patent No.: US 8,563,675 B2
(45) Date of Patent: *Oct. 22, 2013

(54) CURABLE COMPOSITIONS COMPOSED OF SILANES WITH TWO HYDROLYZABLE GROUPS

(75) Inventors: Lars Zander, Rommerskirohen (DE); Thomas Bachon, Duesseldorf (DE); Christiane Kunze, Cologne (DE); Johann Klein, Duesseldorf (DE); Daniela Braun, Shanghai (CN); Sara Gonzalez, Duesseldorf (DE); Ulrich Neuhausen, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 214 days.

This patent is subject to a terminal disclaimer.

(21) Appl. No.: 12/701,959

(22) Filed: Feb. 8, 2010

(65) Prior Publication Data

US 2010/0204387 A1    Aug. 12, 2010

Related U.S. Application Data

(63) Continuation of application No. PCT/EP2008/060483, filed on Aug. 8, 2008.

(30) Foreign Application Priority Data

Aug. 10, 2007    (DE) .......................... 10 2007 038 030

(51) Int. Cl.
  *C08G 77/46* (2006.01)
  *C08F 283/06* (2006.01)

(52) U.S. Cl.
  USPC ............................................ 528/36; 525/474

(58) Field of Classification Search
  USPC ............................................ 525/474; 528/36
  See application file for complete search history.

(56) References Cited

U.S. PATENT DOCUMENTS

| | | | |
|---|---|---|---|
| 7,153,923 B2 * | 12/2006 | Schindler et al. | 528/35 |
| 7,319,128 B2 * | 1/2008 | Ziche et al. | 528/29 |
| 7,973,108 B2 * | 7/2011 | Okamoto et al. | 525/477 |
| 8,030,427 B2 * | 10/2011 | Wakabayashi et al. | 528/17 |
| 2005/0101753 A1 * | 5/2005 | Schindler et al. | 528/34 |
| 2005/0119436 A1 * | 6/2005 | Ziche et al. | 528/29 |
| 2006/0270807 A1 * | 11/2006 | Zhu et al. | 525/453 |
| 2007/0021563 A1 | 1/2007 | Kasai et al. | |
| 2007/0088137 A1 * | 4/2007 | Georgeau et al. | 525/487 |
| 2009/0075086 A1 * | 3/2009 | Jucker et al. | 428/411.1 |
| 2010/0016537 A1 * | 1/2010 | Bamann et al. | 528/19 |
| 2010/0055474 A1 * | 3/2010 | Bachon et al. | 428/429 |
| 2010/0247929 A1 * | 9/2010 | Oertli et al. | 428/446 |

FOREIGN PATENT DOCUMENTS

| | | |
|---|---|---|
| EP | 0254472 | 2/1990 |
| EP | 0931800 | 7/1999 |
| JP | 11-116763 | 4/1999 |
| WO | WO 0149774 A2 * | 7/2001 |
| WO | WO 02/068501 | 9/2002 |
| WO | WO 03/059981 | 7/2003 |
| WO | WO 2005108498 A1 * | 11/2005 |
| WO | WO 2007085620 A1 * | 8/2007 |
| WO | WO 2007085622 A1 * | 8/2007 |

OTHER PUBLICATIONS

Kaneka MS Polymer Technical Data Bulletin.*
Genosil STP-E 35 Technical Data Bulletin.*
Genosil STP-E 30 Technical Data Bulletin.*
Search Report (3 pages) from International Application No. PCT/EP2008/060483 dated Nov. 26, 2008.
Kusakabe et al., Review of Innovative Developments of Silyl-Modified Polymers for Sealants, Adhesive and Coating Applications, European Coatings, pp. 43-50 (2005).

* cited by examiner

*Primary Examiner* — Mike M Dollinger
(74) *Attorney, Agent, or Firm* — James E. Piotrowski; Steven C. Bauman

(57) ABSTRACT

The present invention relates to silane-crosslinking curable compositions encompassing a polymer P having at least two terminal groups of the following formulas (I) and (II) -$A_m$-$K^1$—$SiR^1XY$ (I), -$A_m$-$K^2$—$SiR^2XY$ (II), and/or two polymers $P_1$ and $P_2$, polymer $P_1$ having terminal groups of the following formula (I) -$A_m$-$K^1$—$SiR^1XY$ (I), and polymer $P_2$ having terminal groups of the following formula (II) -$A_m$-$K^2$—$SiR^2XY$ (II), in which A denotes a divalent bonding group, $K^1$, $K^2$, mutually independently, denote a divalent aliphatic hydrocarbon group that has a main chain of 1 to 6 carbon atoms, the hydrocarbon groups $K^1$, $K^2$ being different, X, Y mutually independently denote a hydroxy group or a hydrolyzable group, $R^1$, $R^2$ mutually independently denote a hydrocarbon residue having 1 to 20 carbon atoms, and m assumes the values 0 or 1.

10 Claims, No Drawings

CURABLE COMPOSITIONS COMPOSED OF SILANES WITH TWO HYDROLYZABLE GROUPS

This application is a continuation of International Application No. PCT/EP2008/060483, filed Aug. 8, 2008, which claims the benefit of German Patent Application No. 10 2007 038 030.7 filed Aug. 10, 2007, the contents of each of which are incorporated herein by reference in their entirety.

The present invention relates to silane-crosslinking curable compositions, and to the manufacture and use thereof in adhesives and sealants.

Polymer systems that possess reactive alkoxysilyl groups are known. In the presence of atmospheric moisture these alkoxysilane-terminated polymers are capable, even at room temperature, of condensing with one another with cleavage of the alkoxy groups. Depending on the concentration of alkoxysilyl groups and their structure, what forms as a result are principally long-chain polymers (thermoplastics), relatively wide-mesh three-dimensional networks (elastomers), or highly crosslinked systems (thermosetting plastics).

As a rule, the polymers have an organic basic framework that carries alkoxysilyl groups at the ends. The organic basic framework can involve, for example, polyurethanes, polyesters, polyethers, etc.

Elastic adhesive bonding requires adhesives that on the one hand exhibit high strength but are also sufficiently elastic that they can permanently maintain the adhesive bond. As the strength of the adhesive is increased, a decrease in elastic properties usually occurs. A higher strength is usually achieved by increasing the crosslinking density, which is simultaneously accompanied by a decrease in elasticity. The latter can be restored in part by adding plasticizers. Larger proportions, however, promote migration of the plasticizer, and ultimately impair the strength of the adhesive bond, which is generally undesirable.

The alkoxysilane-terminated polymers used in practice in accordance with the existing art generally contain γ-alkoxysilyl groups, i.e. alkoxysilyl groups that are connected to a framework polymer via a propylene group and a bonding group. These binding agents are often used as a substitute for NCO-terminated polyurethanes, and have considerable toxicological advantages for the processor because they contain no isocyanates.

A more recent development is binding agents that cure by way of so-called dimethoxy compounds based on α-silanes. This refers generally to those alkoxysilane-terminated polymers that have a methylene unit between the dimethoxyalkylsilyl group and a bonding group that links the polymer to the silyl function. These systems generally exhibit good elasticity values, but have very short processing times. EP 1 363 960 B1, for example, describes fast-curing isocyanate-free foamable mixtures having α-isocyanatosilane-terminated prepolymers, which have a high curing speed.

EP 1 396 513 B1 relates to mixed systems based on polyoxyalkylene prepolymers that have trialkoxysilyl groups at one end and mono- or dialkoxysilyl groups at the other. Mixtures of two polyoxyalkylene prepolymers, one comprising trialkoxysilyl groups and other di- or monoalkoxysilyl groups, are also described. These are manufactured by a hydrosilylation process that necessitates long reaction times and does not proceed to completion with regard to the terminal groups of the prepolymers, so that systems manufactured in this fashion exhibit a residual tackiness that is perceived as disadvantageous.

A requirement therefore still exists for isocyanate-free compositions for the manufacture of one- or two-component foams, adhesives, and sealants that have an acceptable curing time as well as particularly good elasticity and extensibility after curing. A desire also exists for an efficient synthesis route, and for compositions that exhibit no residual tackiness.

It is therefore the object of the present invention to make available isocyanate-free crosslinkable compositions that exhibit good elasticity and good strength. A user-friendly curing time is also desired.

It has been found, surprisingly, that silane-crosslinking compositions exhibit particularly good extensibility, elasticity, and good durability (strength) in the adhesive bond, with adequate setting times, when they are assembled from polymers having two different dialkoxysilyl terminal groups or having two different silyl groups that each contain two hydrolyzable groups, wherein the silyl groups differ substantially in terms of the aliphatic hydrocarbon bridges between the silyl groups and the bonding groups to the polymer framework.

The subject matter of the invention is a curable composition encompassing a) a polymer P having at least two terminal groups of the following formulas (I) and (II)

-$A_m$-$K^1$—$SiR^1XY$ (I),

-$A_m$-$K^2$—$SiR^2XY$ (II), and/or b) two polymers $P_1$ and $P_2$, wherein polymer $P_1$ has terminal groups of the following formula (I)

-$A_m$-$K^1$—$SiR^1XY$ (I), and c) polymer $P_2$ has terminal groups of the following formula (II)

-$A_m$-$K^2$—$SiR^2XY$ (II), wherein

A denotes a divalent bonding group, $K^1$, $K^2$, mutually independently, denote a divalent aliphatic hydrocarbon group that has a main chain of 1 to 6 carbon atoms, the hydrocarbon groups $K^1$, $K^2$ being different, X, Y, mutually independently, denote a hydroxy group or a hydrolyzable group, $R^1$, $R^2$, mutually independently, denote a hydrocarbon residue having 1 to 20 carbon atoms, and m assumes the values 0 or 1.

The curable compositions according to the present invention have particularly advantageous properties, in particular high elasticity and good extensibility and strength, which have not hitherto been attained by similar known isocyanate-free binding agents, together with moderate curing times that allow good processability.

A "curable composition" is understood as a substance, or a mixture of multiple substances, that is curable by means of physical or chemical actions. Those chemical or physical actions can consist, for example, in the delivery of energy in the form of heat, light, or other electromagnetic radiation, but also in simply bringing about contact with atmospheric moisture, water, or a reactive component.

Polymers P, $P_1$, $P_2$ comprise a polymer framework having at least two terminal groups (I) and/or (II). Each terminal group (I), (II) encompasses a divalent bonding group. A divalent bonding group A is understood in this context as a divalent chemical group that links the polymer framework of polymers P, $P_1$, $P_2$ to hydrocarbon group $K^1$, $K^2$ of terminal groups (I), (II).

Divalent bonding group A can also be formed during the manufacture of polymers P, $P_1$, $P_2$, e.g. as a urethane group by reaction between a polyether functionalized with hydroxy groups, and an isocyanatodialkoxysilane. The divalent bonding group can, in this context, be both distinguishable and indistinguishable from structural features occurring in the underlying polymer framework. Indistinguishability exists, for example, when it is identical to the linkage points of the repeating units of the polymer framework.

In cases in which the divalent bonding group A is distinguishable from functional groups of the polymer structure of P, $P_1$, or $P_2$ that may be present, m corresponds to a value of 1. If the divalent bonding group A does not differ from the functional groups of the polymer structure, m corresponds to a value of 0.

$K^1$, $K^2$ are divalent aliphatic hydrocarbon groups. This is understood as a straight-chain or branched, saturated or unsaturated alkylene group having a main chain of 1 to 6 carbon atoms, preferably methylene, ethylene, or propylene. When $K^1$ and/or $K^2$ exists in branched fashion, the main chain is preferably branched at only one of the carbon atoms. $K^1$ and $K^2$ are different.

Residues $R^1$, $R^2$ denote, mutually independently in each case, a linear or branched, saturated or unsaturated hydrocarbon residue having 1 to 20 carbon atoms, a saturated or unsaturated cycloalkyl residue having 4 to 20 carbon atoms, or an aryl residue having 6 to 18 carbon atoms. Residues $R^1$ of terminal group (I) and residues $R^2$ of terminal group (II) can be identical or different. This is possible even if terminal groups (I) and (II) are terminal groups of the same polymer. $R^1$, $R^2$ preferably denote a hydrocarbon residue having 1 to 10 hydrocarbon atoms, said residue having a straight-chain, saturated structure.

According to a preferred embodiment of the composition according to the present invention, $K^2$ has a main chain at least one carbon atom longer than $K^1$.

Aliphatic carbon chains, in particular having single bonds, possess a highly movable structure that contributes to the elastic properties of the compositions according to the present invention. Specifically at the reactive ends of the silane-crosslinked polymers, it is particularly advantageous to use polymers having different terminal groups, which moreover can differ in terms of the length of the carbon chain along the main chain in residue $K^1$, $K^2$. The curing speed and extensibility of the composition can thereby be varied within wide limits.

According to a further preferred embodiment of the composition according to the present invention, $K^1$ denotes —$CH_2$—.

Such compounds exhibit high reactivity in the terminating silyl groups, which contributes to a shortening of the setting and curing times.

According to a further preferred embodiment of the composition according to the present invention, $K^2$ denotes —$(CH_2)_3$—.

If a propylene group is selected for $K^2$, these compounds then exhibit particularly high flexibility. This property is attributed to the longer connecting carbon chain between divalent bonding group A and the terminating silyl group, since methylene groups are in general flexible and movable.

$K^1$ preferably denotes methylene groups, and $K^2$ propylene groups. It is thus possible to make available compositions according to the present invention that offer a desirably balanced relationship between good reactivity (i.e. crosslinking speed) and adequate processing time, and as an adhesive bond are highly elastic, flexible, but nevertheless durable.

Compositions according to the present invention in which $K^1$ denotes a methylene group and $K^2$ a propylene group, and the latter exist as constituents of terminal groups (I) and (II) on the same polymer P, are particularly preferred. Such polymers are highly elastic and highly extensible, and furthermore exhibit good strength values, low modulus values, and moderate setting and curing times.

Compositions according to the present invention that contain a total of at least three differently functionalized polymers, namely a polymer P that comprises two different terminal groups (I) and (II), a further polymer $P_1$ that comprises terminal groups (I), and a third polymer $P_2$ that comprises terminal groups (II), are very particularly preferred.

Such compositions exhibit even greater elasticity and, at the same time, acceptable strength. The values for elasticity and breaking strength achievable with such a composition are considerably higher than for mixtures of the individual components $P_1$ and $P_2$.

According to a further preferred embodiment of the composition according to the present invention, X and Y each denote a hydrolyzable group selected from —Cl, —O—C(=O)$R^3$, —$OR^3$, where $R^3$ denotes a hydrocarbon residue having 1 to 20 carbon atoms.

Alkoxy groups, i.e. —$OR^3$, are preferably selected as X and Y, respectively. This is advantageous in particular because such compositions do not, upon curing, release any substances that irritate the mucous membranes. The alcohols formed in this context are harmless in the quantities that are released, and evaporate. Such compositions are therefore particularly suitable for homeowner use. X and Y can denote the same or different functional groups.

According to a further preferred embodiment, $R^3$ denotes —$CH_3$ or —$C_2H_5$.

Compounds having alkoxysilyl groups exhibit different reactivities in chemical reactions depending on the nature of the $R^3$ residues. Within the alkoxy groups, the methoxy group exhibits the greatest reactivity; higher aliphatic residues such as ethoxy, and branched or cyclic residues such as cyclohexyl, produce a much lower reactivity for the terminating alkoxysilyl group. Strongly electronegative groups such as, for example, a chloride or acyloxy group impart to the terminating silyl group a higher reactivity than less-electronegative groups such as, for example, alkoxy groups, but upon curing they release irritating substances that are perceived as unpleasant. In applications where the release of such substances is acceptable, fast-curing systems can thus be manufactured with the aid of chloride groups or acyloxy groups. It is also possible, with the use of these substituents, to increase the reaction speed of polymers having longer hydrocarbon chains at $K^1$ or $K^2$. The elasticity and reaction speed of the compounds can thereby be controlled.

In addition, advantageously, X and Y can be selected so that the residues X and Y on the same alkoxysilyl group are different. Preferably methoxy is selected for X, and ethoxy for Y. This selection allows the desired reactivity of the terminating silyl groups to be adjusted particularly precisely if the silyl groups carrying only methoxy groups are felt to be too reactive, and the silyl groups carrying ethoxy groups too sluggish, for the intended purpose.

According to a further preferred embodiment of the composition according to the present invention, $R^1$ and $R^2$, mutually independently, denote —$CH_3$ or —$C_2H_5$. It has proven particularly advantageous in this context to select methyl or ethyl groups for $R^1$ and $R^2$, since larger (i.e. longer and, in particular, branched) residues greatly decrease the curing speed of the compositions according to the present invention. It is also possible to select unsaturated residues $R^1$, $R^2$ in order to post-crosslink the compositions, for example, via a second mechanism, e.g. by radiation.

According to a further preferred embodiment of the composition, a) X and Y, and/or
b) R¹ and R²
are identical.

If either X and Y or R¹ and R² are identical, synthesis of the polymers P, P₁, P₂ becomes simpler. If both X and Y as well as R¹ and R² are identical, the terminal groups (I) and (II) differ only in terms of the configuration of the divalent hydrocarbon group K¹ or K², so that the synthesis of P, P₁, P₂ becomes even simpler. In addition, such compositions according to the present invention can be processed into more-homogeneous products.

According to a further preferred embodiment of the composition according to the present invention, the divalent bonding group A denotes an amide, carbamate, urea, imino, carboxy, carbonate, thio, mercapto, or sulfonate group, or an oxygen atom, particularly preferably a urethane group. These divalent bonding groups can be formed, for example, upon manufacture of polymers P, P₁, P₂, by reacting a framework polymer with reactive compounds that carry terminal groups (I), (II). The compositions according to the present invention preferably comprise urethane groups as divalent bonding groups, since a polymer framework having terminal hydroxy groups, as well as isocyanatosilanes as the compounds carrying reactive terminal groups, are used by preference in the manufacture of the composition according to the present invention.

According to a further preferred embodiment of the composition according to the present invention, the polymers P, P₁, P₂ each comprise a polymer framework that is respectively selected from alkyd resins, (meth)acrylates and (meth)acrylamides and salts thereof, phenol resins, polyalkylenes, polyamides, polycarbonates, polyols, polyethers, polyesters, polyurethanes, vinyl polymers, siloxanes, and copolymers made up of at least two of the aforesaid classes of polymer.

Polyols, in particular polyethylene oxide and/or polypropylene oxide, are particularly preferably used.

Polyols that contain polyethers as a polymer framework possess a flexible and elastic structure not only at the terminal groups but also in the polymer backbone. Compositions that once again exhibit improved elastic properties can be produced therewith. Polyethers are not only flexible in their framework, but also at the same time strong. For example, polyethers are not attacked or decomposed by water and bacteria, in contrast to, for example, polyesters. Polyethylene oxides and/or polypropylene oxides are therefore used with particular preference.

According to a further preferred embodiment of the composition according to the present invention, the molecular weight $M_n$ of the polymer framework is between 3000 and 50,000 g/mol. Further particularly preferred molecular weight ranges are 5000 to 25,000 g/mol, 8000 to 19,000 g/mol are very particularly preferred.

These molecular weights are particularly advantageous because compositions having these molecular weights exhibit viscosities that enable easy processability.

Very particularly preferably, polyoxyalkylenes, in particular polyethylene oxides or polypropylene oxides, that have a polydispersity PD of less than 2, preferably less than 1.5, are used.

The molecular weight $M_n$ is understood as the arithmetically averaged molecular weight of the polymer. This, like the weight-averaged molecular weight $M_w$, can be determined by gel permeation chromatography (GPC, also SEC). This method is known to one skilled in the art. The polydispersity is derived from the average molecular weights $M_w$ and $M_n$. It is calculated as PD=$M_w/M_n$.

Particularly advantageous viscoelastic properties can be achieved if polyoxyalkylene polymers that possess a narrow molecular-weight distribution, and therefore a low polydispersity, are used as polymeric basic frameworks. These can be manufactured, for example, by so-called double metal cyanide catalysis (DMC catalysis). These polyoxyalkylene polymers are notable for a particularly narrow molecular weight distribution, a high average molecular weight, and a very small number of double bonds at the end of the polymer chains.

Polyoxyalkylene polymers of this kind have a polydispersity PD ($M_w/M_n$) of at most 1.7.

Particularly preferred organic basic frameworks are, for example, polyethers having a polydispersity of approximately 1.01 to approximately 1.3, in particular approximately 1.05 to approximately 1.18, for example approximately 1.08 to approximately 1.11 or approximately 1.12 to approximately 1.14.

In a preferred embodiment of the invention, these polyethers have an average molecular weight ($M_n$) of approximately 5000 to approximately 30,000, in particular approximately 6000 to approximately 25,000. Polyethers having average molecular weights from approximately 10,000 to approximately 22,000, in particular having average molecular weights from approximately 12,000 to approximately 18,000, are particularly preferred.

It is also conceivable to use polymers having a higher molecular weight. If the viscosity of the composition is higher than desired, for example because of a high molecular weight or strong internal bonding forces, the processing viscosity can be adjusted by adding reactive diluents or plasticizers, and a preparation exhibiting the desired properties can thus be produced.

Mixtures of multiple polymers having different molecular weights $M_n$ can also be used according to the present invention instead of pure polymers. In this case the statements with regard to polydispersity and molecular weight $M_n$ are to be understood in such a way that, advantageously, each of the polymers on which the mixture is based exhibits a polydispersity in the preferred range, but the preferred molecular-weight ranges refer to the value averaged over the entire mixture of the polymers that are used.

A further subject of the present invention is a method for manufacturing a curable composition, in which method
a) a polymer P' having a polymer framework having at least two terminal groups C, and
b) two compounds having functional groups D, which groups are reactive with respect to C and have the general formulas (III) and (IV)

$$D-K^1-SiR^1XY \qquad (III),$$

$$D-K^2-SiR^2XY \qquad (IV),$$

are reacted with one another,
wherein in the context of the reaction, substances (III) and (IV) are added simultaneously, or
first compound (IV) and then compound (III) is added within a short time interval to polymer P';
C and D being selected from one of the groups
—OH, —NHR⁴, —NH₂, —Cl, —Br, —SH, and
—NCO, —NCS, —C(=O)Cl, —C(=O)OR⁵,
and C and D do not belong to the same group;
K¹, K², mutually independently, denote a divalent aliphatic hydrocarbon group that comprises a main chain of 1 to 6 carbon atoms, the hydrocarbon groups K¹, K² being different,
X, Y, mutually independently, denote a hydroxy group or a hydrolyzable group, $R^1$, $R^2$, $R^4$, $R^5$, mutually independently, each denote a hydrocarbon residue having 1 to 20 carbon atoms.

All polymers that possess at least two terminal functional groups C are suitable in principle for manufacturing polymers P' and P'''. Alkyd resins, acrylates and methacrylates, acrylamides and methacrylamides, phenol resins, polyalkylenes, polyamides, polycarbonates, polyols, polyethers, polyesters, polyether esters, polyurethanes, vinyl polymers, siloxanes, and copolymers made up of at least two of the aforesaid classes of polymer, are preferably used in this context. Also suitable are all polymers that were described above as a polymer framework of polymers P, $P_1$, and $P_2$.

It is particularly preferred to use polyoxyalkylenes, i.e. polyethers, since they are flexible, but at the same time strong, even in their basic framework. Unlike polyesters, for example, polyethers are normally not attacked or decomposed by water and bacteria. Polyethylene oxide or polypropylene oxide are very particularly preferred, especially those that have a polydispersity of less than 2, preferably less than 1.5.

The terminal groups C can be derived, for example, from the repeating unit of the selected framework polymer, i.e. can be functional groups of the monomer that constructs polymer P', P'''; can be introduced by refunctionalization of terminal groups C of the polymer framework; or can be present as further functional groups.

All functional groups that are capable of a bonding linkage are suitable as groups C.

Two compounds (III), (IV) that possess groups D that are reactive with C are used as further components in the methods according to the present invention. All functional groups that can be linked to the functional groups C of polymer P' or P''' are conceivable as groups D.

Functional groups C and D are preferably each selected from one of the two following groups, such that in the method according to the present invention, the functional groups C and D are not taken from the same groups:

Group I: hydroxy (—OH); amino (—NH$_2$); secondary amino (—NHR)—; halogen groups such as, for example, chloride (—Cl) or bromide (—Br); sulfanyl (—SH);

Group II: isocyanato (—NCO, also isocyanate), isothiocyanato (—NCS), acylchloro (—C(=O)Cl), ester (—C(=O)OR); sulfonic acid (—SO$_3$H); sulfonic acid chloride (—SO$_3$Cl); ethylenically unsaturated groups.

It is an element of the general knowledge of one skilled in the art to arrive at a suitable selection so that groups C and D can react with one another.

For example, for reaction with a polymer P' or P''' whose functional groups C are halogen, hydroxy, amino, or sulfanyl groups, compounds (III), (IV) having groups D selected from acylchloro, isocyanato, thioisocyanato, and ester groups are particularly preferably suitable, very particularly preferably isocyanato groups.

It is similarly conceivable to select groups C from acylchloro, isocyanato, thioisocyanato, and ester groups, and groups D from halogen, hydroxy, amino, or sulfanyl groups.

If an NCO group is selected as group D, the following isocyanatosilanes can by preference be used: methyldimethoxysilylmethyl isocyanate, ethyldimethoxysilylmethyl isocyanate, methyldiethoxysilylmethyl isocyanate, ethyldiethoxysilylmethyl isocyanate, methyldimethoxysilylethyl isocyanate, ethyldimethoxysilylethyl isocyanate, methyldiethoxysilylethyl isocyanate, ethyldiethoxysilylethyl isocyanate, methyldimethoxysilylpropyl isocyanate, ethyldimethoxysilylpropyl isocyanate, methyldiethoxysilylpropyl isocyanate, ethyldiethoxysilylpropyl isocyanate, methyldimethoxysilylbutyl isocyanate, ethyldimethoxysilylbutyl isocyanate, methyldiethoxysilylbutyl isocyanate, diethylethoxysilylbutyl isocyanate, ethyldiethoxysilylbutyl isocyanate, methyldimethoxysilylpentyl isocyanate, ethyldimethoxysilyipentyl isocyanate, methyldiethoxysilylpentyl isocyanate, ethyldiethoxysilylpentyl isocyanate, methyldimethoxysilylhexyl isocyanate, ethyldimethoxysilylhexyl isocyanate, methyldiethoxysilylhexyl isocyanate, ethyldiethoxysilylhexyl isocyanate.

Methyldimethoxysilylmethyl isocyanate, methyldiethoxysilylmethyl isocyanate, methyldimethoxysilylpropyl isocyanate, and ethyldimethoxysilylpropyl isocyanate are particularly preferred.

Polyols and polyamines, in particular polyethylene glycols and polypropylene glycols, are particularly preferably suitable as reaction partners for compounds in which isocyanate groups are selected as groups D.

The methods according to the present invention for manufacturing the composition according to the present invention can be carried out in two variants.

In a first method, a polymer P' having at least two terminal functional groups C is reacted with two compounds that have groups D that are reactive with respect to C. Polymer P' and the two compounds having the general formulas (III) and (IV) are combined simultaneously, and any catalysts, solvents, and other additives are added and reacted with one another while stirring. The reaction can thereby be carried out in uncomplicated fashion in a single-pot method, and easily managed in large batches.

Alternatively thereto, a polymer P' and, if applicable, catalysts, solvents, and other additives can be made ready, and compound (IV) can be stirred in a first step, followed after a short time interval by compound (III), during reaction.

This procedure can advantageously be selected when the intention is to establish specifically preferred reaction conditions. If, for example, a polymer P having the terminal groups (I) and (II), as described in the main claim, is to be manufactured, and if compound (III), for example, is notable for a considerably higher reactivity than compound (IV), it is possible in this fashion to achieve more uniform reaction of compounds (III) and (IV) with polymer P'; in this context, "uniform" is to be understood to mean that the number of terminal groups (I) and (II) on the polymer P in question is intended to be similar after the reaction. This method, too, can be carried out as a single-pot method.

When compound (III) and (IV) are added within a short time interval, this is understood to mean that first compound (IV) and then compound (III) is introduced into the reaction.

A "short time interval" is understood as a period between immediately sequential and a time delay of several minutes. A period of 1, 2, 5, 10, 15, 20, or 30 minutes can thus exist between addition of the two compounds. A short time interval is preferably equal to 5 to 15 minutes.

A further subject of the present invention is a method for manufacturing a curable composition, in which method a) firstly a polymer P' having a polymer framework having at least two terminal functional groups C is reacted with compound (III)

$$D-K^1\text{—}SiR^1XY \qquad (III),$$

separately therefrom, b) a polymer P''' having a polymer framework having at least two terminal functional groups C is reacted with compound (IV)

$$D-K^2\text{—}SiR^2XY \qquad (IV),$$

and c) then the reaction products of step a) and step b) are mixed with one another,
wherein
C and D are selected from one of the groups
—OH, —NHR$^4$, —NH$_2$, —Cl, —Br, —SH, and
—NCO, —NCS, —C(=O)Cl, —C(=O)OR$^5$,
and C and D do not belong to the same group;
K$^1$, K$^2$, mutually independently, denote a divalent aliphatic hydrocarbon group that has a main chain of 1 to 6 carbon atoms, the hydrocarbon groups K$^1$, K$^2$ being different,
X, Y, mutually independently, denote a hydroxy group or a hydrolyzable group,
R$^1$, R$^2$, R$^4$, R$^5$, mutually independently, denote a hydrocarbon residue having 1 to 20 carbon atoms.

With this method it is possible both for two polymers P' and P'', and also (preferably) for two batches of the same polymer P', to be reacted with compounds (III) and (IV). The reaction, and the selection of suitable components, are accomplished in accordance with the considerations below, with the difference that only one compound (III) or (IV) is respectively used for each polymer P', P'' or for each batch of P'.

The two reactions are carried out separately. The reaction products thereby obtained (polymers P$_1$ and P$_2$) are then mixed with one another.

Polymers P$_1$ and P$_2$ can each be introduced in equal parts, but also in different parts, into the mixture, although a mixing ratio of polymer P$_1$ and P$_2$ of between 2:1 and 1:2, preferably 1.5:1 and 1:1.5, is preferred.

All polymers P' that possess at least two terminal functional groups C are suitable in principle for manufacturing polymers P$_1$ and P$_2$ according to this method. Alkyd resins, acrylates and methacrylates, acrylamides and methacrylamides, phenol resins, polyalkylenes, polyamides, polycarbonates, polyols, polyethers, polyesters, polyether esters, polyurethanes, vinyl polymers, siloxanes, and copolymers made up of at least two of the aforesaid classes of polymer, are preferably used in this context. Also suitable are all polymers that were described above as a polymer framework of polymers P, P$_1$, or P$_2$.

It is particularly preferred to use polyoxyalkylenes, i.e. polyethers, since they are flexible, but at the same time strong, even in their basic framework. Unlike polyesters, for example, polyethers are normally not attacked or decomposed by water and bacteria.

Polyethylene oxide or polypropylene oxide are very particularly preferred, especially those that have a polydispersity of less than 2, preferably less than 1.5.

The terminal groups C can be derived, for example, from the repeating unit of the selected framework polymer, i.e. can be functional groups of the monomer that constructs polymer P', P''; can be introduced by refunctionalization of terminal groups C of the polymer framework; or can be present as further functional groups.

All functional groups that are capable of a bonding linkage are suitable as groups C.

Two compounds (III), (IV) that possess groups D that are reactive with C are used as further components in the methods according to the present invention. All functional groups that can be linked to functional groups C of polymer P' or P'' are conceivable as groups D.

The functional groups C and D are preferably each selected from one of the two following groups, such that in the method according to the present invention, the functional groups C and D are not taken from the same groups:

Group I: hydroxy (—OH); amino (—NH$_2$); secondary amino (—NHR)—; halogen groups such as, for example, chloride (—Cl) or bromide (—Br); sulfanyl (—SH);
Group II: isocyanato (—NCO, also isocyanate), isothiocyanato (—NCS), acylchloro (—C(=O)Cl), ester (—C(=O)OR); sulfonic acid (—SO$_3$H); sulfonic acid chloride (—SO$_3$Cl); ethylenically unsaturated groups.

It is an element of the general knowledge of one skilled in the art to arrive at a suitable selection so that groups C and D can react with one another.

For example, for reaction with a polymer P' or P'' whose functional groups C are halogen, hydroxy, amino, or sulfanyl groups, compounds (III), (IV) having groups D selected from acylchloro, isocyanato, thioisocyanato, and ester groups are particularly preferably suitable, very particularly preferably isocyanato groups.

It is similarly conceivable to select groups C from acylchloro, isocyanato, thioisocyanato, and ester groups, and groups D from halogen, hydroxy, amino, or sulfanyl groups.

If an NCO group is selected as group D, the following isocyanatosilanes can by preference be used: methyldimethoxysilylmethyl isocyanate, ethyldimethoxysilylmethyl isocyanate, methyldiethoxysilylmethyl isocyanate, ethyldiethoxysilylmethyl isocyanate, methyldimethoxysilylethyl isocyanate, ethyldimethoxysilylethyl isocyanate, methyldiethoxysilylethyl isocyanate, ethyldiethoxysilylethyl isocyanate, methyldimethoxysilylpropyl isocyanate, ethyldimethoxysilylpropyl isocyanate, methyldiethoxysilylpropyl isocyanate, ethyldiethoxysilylpropyl isocyanate, methyldimethoxysilylbutyl isocyanate, ethyldimethoxysilylbutyl isocyanate, methyldiethoxysilylbutyl isocyanate, diethylethoxysilylbutyl isocyanate, ethyldiethoxysilylbutyl isocyanate, methyldimethoxysilylpentyl isocyanate, ethyldimethoxysilylpentyl isocyanate, methyldiethoxysilylpentyl isocyanate, ethyldiethoxysilylpentyl isocyanate, methyldimethoxysilylhexyl isocyanate, ethyldimethoxysilylhexyl isocyanate, methyldiethoxysilylhexyl isocyanate, ethyldiethoxysilylhexyl isocyanate.

Methyldimethoxysilylmethyl isocyanate, methyldiethoxysilylmethyl isocyanate, methyldimethoxysilylpropyl isocyanate, and ethyldimethoxysilylpropyl isocyanate are particularly preferred.

Polyols and polyamines, in particular polyethylene glycols and polypropylene glycols, are particularly preferably suitable as reaction partners for compounds in which isocyanate groups are selected as groups D.

The methods according to the present invention can also be carried out in the presence of catalysts. For the case in which, for example, hydroxy or amino groups are present as group C, and isocyanate groups as group D, or isocyanate groups are present for group C and hydroxy or amino groups for group D, all catalysts known from polyurethane manufacture can be used. Included among the catalysts usually used in the context of such polyurethane manufacture are, for example, highly basic amides such as 2,3-dimethyl-3,4,5,6-tetrahydropyrimidine, tris(dialkylaminoalkyl)-s-hexahydrotriazines, e.g. tris(N,N-dimethylaminopropyl)-s-hexahydrotriazine or the usual tertiary amines, e.g. triethylamine, tributylamine, dimethylbenzylamine, N-ethyl-, N-methyl-, N-cyclohexylmorpholine, dimethylcyclohexylamine, dimorpholinodiethyl ether, 2-(dimethylaminoethoxy)ethanol, 1,4-diazabicyclo[2,2,2]octane, 1-azabicyclo[3,3,0]octane, N,N,N',N'-tetramethylethylenediamine, N,N,N',N'-tetramethylbutanediamine, N,N,N',N'-tetramethylhexanediamine-1,6, pentamethyldiethylenetriamine, tetramethyldiaminoethyl ether, bis(dimethylaminopropyl)urea, N,N'-dimethylpiperazine, 1,2-dimethylimidazole, di-(4-N,N-dimethylaminocyclohexyl) methane, and the like, as well as organometallic compounds such as titanic acid esters, iron compounds such as e.g. iron (III) acetylacetonate, tin compounds, e.g. tin(II) salts of organic carboxylic acids, for example tin(II) diacetate, the tin(II) salt of 2-ethylhexanoic acid (tin(II) octoate), tin(II) dilaurate, or the dialkyltin(IV) salts of organic carboxylic acids such as, for example, dibutyltin(IV) diacetate, dibutyltin(IV) dilaurate, dibutyltin(IV) maleate, or dioctyltin(IV) diacetate, or the like, as well as dibutyltin(IV) dimercaptide, or mixtures of two or more of the aforesaid.

Bismuth catalysts are particularly preferred, since they promote the linkage of groups C and D to form urethane and isocyanurate groups; but activation of the silyl groups, in particular the alkoxysilyl groups, and therefore premature curing, does not take place.

Bismuth carboxylates, for example bismuth (2-ethylhexanoate), bismuth neodecanoate, bismuth tetramethylheptanedionate, bismuth(II) diacetate, bismuth(II) dilaurate, or the dialkylbismuth(IV) salts, e.g. dibutylbismuth(IV) diacetate, dibutylbismuth(IV) dilaurate, dibutylbismuth(IV) maleate, or dioctylbismuth(IV) diacetate, or the like, as well as dibutylbismuth(IV) dimercaptide, or mixtures of two or more of the aforesaid catalysts, can be used as bismuth catalysts.

The catalysts can be used in usual quantities, for example approximately 0.002 to approximately 5 wt %, based on the polyalcohols.

According to a further preferred embodiment of the methods according to the present invention, they are carried out at elevated temperature, in particular in a range between 60 and 100° C., particularly preferably between 75 and 85° C.

Advantageously, elevating the temperature can accelerate the reaction or, in some cases, even be what causes it to proceed.

The reaction can furthermore be carried out at decreased pressure, i.e. in a partial vacuum. It is preferable to establish a pressure between 10 and 1000 Pa. It is thereby possible in the context of the reaction to remove from the reaction any secondary products that may occur, in particular low-molecular-weight ones having a molecular weight below 200 g/mol, in particular water or ammonia. Higher purity for the reaction product P, $P_1$, or $P_2$ can thereby be achieved. It is moreover possible in this fashion to achieve a greater degree of reaction, i.e. greater reaction efficiency.

It is also conceivable to carry out the methods according to the present invention at elevated temperature and decreased pressure. The result is that the reaction can be accelerated, and at the same time higher purity for the reaction product can be attained.

According to a further preferred embodiment of the method according to the present invention, the ratio of functional groups D to functional groups C is between 3:1 and 1:1.

It has proven advantageous to use the compounds having functional groups D, that are reacted with the terminal functional groups C of polymer P' or P''', in excess with respect to the number of functional groups. A higher degree of reaction with regard to the groups C of P' or P''' can thereby be achieved. If some functional group D is still present in the reaction product after reaction, the substances having those groups can be removed in accordance with usual methods, for example distillation or extraction. An excess of functional groups D can furthermore be eliminated by adding low-molecular-weight compounds that likewise react with the groups D. Low-molecular-weight compounds that comprise the above-described groups C can be used for this. "Low-molecular-weight compounds" are understood in this context as those that have a molecular weight of less than 200 g/mol. Methanol or ethanol can be used, for example, if D denotes NCO.

In the course of the reaction of polymers P' and P''', their terminal groups C react with groups D of compounds (III) and (IV) and form the divalent bonding groups A to polymers P, $P_1$, $P_2$. The so-called divalent bonding group A usually differs from the structural features of polymers $P_1$ and $P_2$, which as a general rule likewise comprise functional groups, for example as a linkage or as constituents of the repeating units.

In cases in which the divalent bonding group A is distinguishable from functional groups of the polymer framework of P, $P_1$, and $P_2$, m corresponds to a value of 1.

If the divalent bonding groups A are not distinguishable from the functional groups of the polymer framework, m corresponds to a value of 0. The index m consequently provides no information as to the presence of divalent bonding group A, but does inform as to whether it is distinguishable from the structure of the polymer framework.

Particularly preferably, the ratio of functional groups D to functional groups C is between 2:1 and 1.3:1. By selecting these advantageous ratios it is possible to ensure that the excess of compounds having functional groups D with respect to polymers P', P''' having functional groups C is small with respect to groups D and C. Ideally, however, a small excess of compounds having functional groups D is used in order to react terminal groups C of polymers P' and P''' as completely as possible, and thereby obtain polymers P, $P_1$, and $P_2$. Advantageously, the compounds having groups D are used to excess, since it is easier to remove a low-molecular-weight compound (such as, for example, one having groups D) from the reaction product than to remove polymers P' and P''' in which not all groups C have been reacted.

A further manufacturing method for manufacturing polymers P, $P_1$, and $P_2$ according to the present invention proceeds from polymers P' and P''' having ethylenically unsaturated terminal groups C. In this case, the group D of compound (III) or (IV) denotes a hydrogen atom. Such reactions are usually carried out for several hours at temperatures from 30 to 150° C., by preference 60 to 120° C., in the presence of a catalyst. Compounds of platinum, rhodium, cobalt, palladium, or nickel are suitable as catalysts. Platinum catalysts, such as platinum metal, platinum chloride, and chloroplatinic acid, are preferred.

A further subject of the present invention is a curable composition that can be manufactured in accordance with one of the methods according to the present invention.

These compositions are notable for high elasticity, flexibility, and extensibility, with adequate setting and curing times.

A further subject of the present invention is a preparation that contains the curable composition according to the present invention, or contains a composition that was manufactured in accordance with one of the methods according to the present invention.

These preparations encompass compositions that possess improved elastic properties and improved rebound capability. They furthermore exhibit a sufficiently long processing time, and nevertheless cure quickly. The preparations according to the present invention can contain further substances with which they can be further adapted with regard to the desired application.

According to a further preferred embodiment of the preparation according to the present invention, it further contains at least one compound selected from the group encompassing plasticizers, stabilizers, antioxidants, catalysts, fillers, reactive diluents, drying agents, adhesion promoters, and UV stabilizers, rheological adjuvants, and/or solvents.

It is also conceivable that the viscosity of the adhesive or sealant according to the present invention may be too high for specific applications. This can usually be decreased (adjusted) in simple and appropriate fashion by using a reactive diluent, without resulting in demixing phenomena (e.g. plasticizer migration) in the cured substance.

The reactive diluent preferably comprises at least one functional group that reacts, for example, with moisture or atmospheric oxygen after application. Examples of such groups are silyl groups, isocyanate groups, vinyl-unsaturated groups, and polyunsaturated systems.

All compounds that are miscible with the adhesive or sealant with a decrease in viscosity, and that possess at least one group that is reactive with the binding agent, can be used as reactive diluents.

The viscosity of the reactive diluent is preferably less than 20,000 mPas, particularly preferably approximately 0.1 to 6000 mPas, very particularly preferably 1 to 1000 mPas (Brookfield RVT, 23° C., spindle 7, 10 rpm).

The following substances can be used, for example, as reactive diluents: polyalkylene glycols reacted with isocyanatosilanes (e.g. Synalox 100-50B, Dow), carbamatopropyltrimethoxysilane, alkyltrimethoxysilane, alkyltriethoxysilane, such as methyltrimethoxysilane, methyltriethoxysilane, and vinyltrimethoxysilane (XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyitriethoxysilane (IO Triethoxy, Wacker), N-trirnethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of said compounds.

Also usable as reactive diluents are the following polymers of Kaneka Corp.: MS 5203H, MS 5303H, MS SAT 010, and MS SAX 350.

Silane-modified polymers that are derived, for example, from the reaction of isocyanatosilane with Synalox grades can likewise be used.

Polymers that can be manufactured from an organic basic framework by grafting with a vinylsilane, or by reaction with polyol, polyisocyanate, and alkoxysilane, can furthermore be used as reactive diluents.

A "polyol" is understood as a compound that can contain one or more OH groups in the molecule. The OH groups can be both primary and secondary.

Included among the suitable aliphatic alcohols are, for example, ethylene glycol, propylene glycol, and higher glycols, as well as other polyfunctional alcohols. The polyols can additionally contain further functional groups such as, for example, esters, carbonates, amides.

For manufacture of the reactive diluents preferred according to the present invention, the corresponding polyol component is reached respectively with an at least difunctional isocyanate. Any isocyanate having at least two isocyanate groups is appropriate as an at least difunctional isocyanate, but compounds having two to four isocyanate groups, in particular having two isocyanate groups, are generally preferred in the context of the present invention.

The compound present as a reactive diluent in the context of the present invention preferably comprises at least one alkoxysilyl group, the di- and trialkoxysilyl groups being preferred among the alkoxysilyl groups.

Suitable polyisocyanates for manufacturing a reactive diluent are, for example, ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl) fumarate, as well as mixtures of two or more thereof, 1-isocyanato-3,3,5-trimethyl-5-isocyanatomethyl-cyclohexane (isophorone diisocyanate, IPDI), 2,4- and 2,6-hexahydrotoluoylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), or partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate as well as partially or completely hydrogenated cycloalkyl derivatives thereof, 4,4'-diisocyanatophenylperfluorethane, phthalic acid bisisocyanatoethyl ester, 1-chloromethylphenyl-2,4- or -2,6-diisocyanate, 1-bromomethylphenyl-2,4- or -2,6-diisocyanate, 3,3-bischloromethyl ether-4,4'-diphenyldiisocyanate, sulfur-containing diisocyanates such as those obtainable by reacting 2 mol diisocyanate with 1 mol thiodiglycol or dihydroxyhexylsulfide, the di- and triisocyanates of the di- and trimer fatty acids, or mixtures of two or more of the aforesaid diisocyanates.

It is also possible to use as polyisocyanates trivalent or higher-valence isocyanates such as those obtainable, for example, by oligomerization of diisocyanates, in particular by oligomerization of the aforementioned isocyanates. Examples of such trivalent and higher-valence polyisocyanates are the triisocyanurates of HDI or IPDI or mixtures thereof, or mixed triisocyanurates thereof, as well as polyphenylmethylene polyisocyanate as obtainable by phosgenation of aniline-formaldehyde condensation products.

Solvents and/or plasticizers can also be used, alongside or instead of a reactive diluent, to reduce the viscosity of the preparation according to the present invention.

Aliphatic or aromatic hydrocarbons, halogenated hydrocarbons, alcohols, ketones, ethers, esters, ester alcohols, ketoalcohols, ketoethers, ketoesters, and ether esters are suitable as solvents. Alcohols are, however, preferably used, since shelf stability then rises. $C_1$ to $C_{10}$ alcohols, in particular methanol, ethanol, isopropanol, isoamyl alcohol, and hexanol, are preferred.

The preparation can further contain hydrophilic plasticizers. These serve to improve moisture uptake and thus to improve reactivity at low temperatures. Suitable as plasticizers are, for example, esters of abietic acid, adipic acid esters, azelaic acid esters, benzoic acid esters, butyric acid esters, acetic acid esters; esters of higher fatty acids having approximately 8 to approximately 44 carbon atoms, esters of OH-group-carrying or epoxidized fatty acids, fatty acid esters, and fats, glycolic acid esters, phosphoric acid esters, phthalic acid esters of linear or branched alcohols containing 1 to 12 carbon atoms, propionic acid esters, sebacic acid esters, sulfonic acid esters, thiobutyric acid esters, trimellitic acid esters, citric acid esters, and esters based on nitrocellulose and polyvinyl acetate, as well as mixtures of two or more thereof. The asymmetrical esters of adipic acid monooctyl ester with 2-ethylhexanol (Edenol DOA, Cognis Deutschland GmbH, Düsseldorf) are particularly suitable.

Suitable among the phthalic acid esters are, for example, dioctyl phthalate, dibutyl phthalate, diisoundecyl phthalate, or butylbenzyl phthalate, and among the adipates dioctyl adipate, diisodecyl adipate, diisodecyf succinate, or dibutyl sebacate or butyloleate.

Also suitable as plasticizers are the pure or mixed ethers of monofunctional, linear, or branched $C_{4-16}$ alcohols or mixtures of two or more different ethers of such alcohols, for example dioctyl ether (obtainable as Cetiol OE, Cognis Deutschland GmbH, Düsseldorf).

Also suitable as plasticizers are end-capped polyethylene glycols, for example di-$C_{1-4}$ alkyl ethers of polyethylene glycol or polypropylene glycol, in particular the dimethyl or diethyl ethers of diethylene glycol or dipropylene glycol, as well as mixtures of two or more thereof.

Particularly preferred, however, are end-capped polyethylene glycols such as dialkyl ethers of polyethylene glycol or polypropylene glycol, in which the alkyl residue contributes one to four carbon atoms, and in particular the dimethyl and diethyl ethers of diethylene glycol and dipropylene glycol. Acceptable curing even under less favorable application conditions (low relative humidity, low temperature) is achieved in particular with dimethyldiethylene glycol. For further details regarding plasticizers, the reader is referred to the relevant chemical engineering literature.

Also suitable in the context of the present invention as plasticizers are diurethanes, which can be manufactured e.g. by reacting diols having OH terminal groups with monofunctional isocyanates, by selecting the stoichiometry so that substantially all the free OH groups react completely. Any excess isocyanate can then be removed from the reaction mixtures, for example, by distillation. A further method for manufacturing diurethanes involves reacting monofunctional alcohols with diisocyanates, ensuring that if possible all the NCO groups react.

Suitable catalysts for controlling the curing speed of the curable compositions according to the present invention are, for example, organometallic compounds such as iron or tin compounds, in particular the 1,3-dicarbonyl compounds of iron or of di- or tetravalent tin, the tin(II) carboxylates or dialkyltin(IV) dicarboxylates, or the corresponding dialkoxylates, e.g. dibutyltin dilaurate, dibutyltin diacetate, dioctyltin diacetate, dibutyltin maleate, tin(II) octoate, tin(II) phenolate, or the acetylacetonates of di- or tetravalent tin. It is also possible to use alkyl titanates, organosilicon titanium compounds, or bismuth tris-2-ethylhexanoate, acid compounds such as phosphoric acid, p-toluenesulfonic acid, or phthalic acid, aliphatic amines such as butylamine, hexylamine, octylamine, decylamine, or laurylamine, aliphatic diamines such as, for example, ethylenediamine, hexyldiamine, or also aliphatic polyamines such as diethylenetriamine, triethylenetetramine, tetraethylenepentamine, heterocyclic nitrogen compounds, e.g. piperidine, piperazine, aromatic amines such as m-phenylenediamine, ethanolamine, triethylamine, and other curing catalysts for epoxies.

Also suitable are the following tin compounds: di(n-butyl)tin(IV) di(methylmaleate), di(n-butyl)tin(IV) di(butylmaleate), di(n-octyl)tin(IV) di(methylmaleate), di(n-octyl)tin(IV)-di(butylmaleate), di(n-octyl)tin(IV) di(isooctylmaleate), di(n-butyl)tin(IV) sulfide, di(n-butyl)tin(IV) oxide, di(n-octyl)tin(IV) oxide, (n-butyl)$_2$Sn(SCH$_2$COO), (n-octyl)$_2$Sn(SCH$_2$COO), (n-octyl)$_2$Sn(SCH$_2$CH$_2$COO), (n-octyl)$_2$Sn(SCH$_2$CH$_2$COOCH$_2$CH$_2$OCOCH$_2$S), (n-butyl)$_2$Sn(SCH$_2$COO-i-C$_8$H$_{17}$)$_2$, (n-octyl)$_2$Sn(SCH$_2$COO-i-C$_8$H$_{17}$)$_2$, (n-octyl)$_2$Sn(SCH$_2$COO-n-C$_8$H$_{17}$)$_2$.

Chelate-forming tin organyls can also be used, for example di(n-butyl)tin(IV) di(acetylacetonate), di(n-octyl)tin(IV) di(acetylacetonate), (n-octyl)(n-butyl)tin(IV) di(acetylacetonate).

Boron halides, such as boron trifluoride, boron trichloride, boron tribromide, boron triiodide, or mixed boron halides, can furthermore also be used as curing catalysts. Boron trifluoride complexes such as, for example boron trifluoride diethyl etherate (CAS no. [109-63-7]), which, as liquids, are easier to handle than the gaseous boron halides, are particularly preferred.

By preference, compounds of titanium, aluminum, and zirconium, or mixtures of one or more catalysts from one or more of the groups just mentioned, can also be used. These catalysts are suitable as curing catalysts for the alkoxysilane polymers. One the one hand it is thereby possible to avoid the use of tin compounds; on the other hand, better adhesion to organic surfaces (for example, acrylates) that normally adhere poorly can thereby be improved. Among the titanium, aluminum, and zirconium catalysts, the titanium catalysts are preferred for use because the best curing results are obtained with them.

Compounds that comprise hydroxy groups and/or substituted or unsubstituted alkoxy groups are suitable as titanium catalysts, i.e. titanium alkoxides of the general formula $$Ti(OR^z)_4$$

where $R^z$ is an organic group, by preference a substituted or unsubstituted hydrocarbon group having 1 to 20 carbon atoms, and the four —$OR^z$ alkoxy groups are identical or different. One or more of the —$OR^z$ residues can also be replaced by acyloxy groups —$OCOR^z$.

Also suitable as titanium catalysts are titanium alkoxides in which one or more alkoxy groups are replaced by halogen atoms.

The following mixed-substituted or non-mixed-substituted titanium alkoxides can be used, for example, as titanium catalysts: tetramethoxy titanium, tetraethoxy titanium, tetraallyloxy titanium, tetra-n-propoxy titanium, tetraisopropoxy titanium, tetra-n-butoxy titanium, tetraisobutoxy titanium, tetra-(2-butoxy) titanium, tetra(t-butoxy) titanium, tetrapentoxy (titanium), tetracyclopentoxy titanium, tetrahexoxy titanium, tetracyclohexoxy titanium, tetrabenzoxy titanium, tetraoctoxy titanium, tetrakis(2-ethylhexoxy) titanium, tetradecoxy titanium, tetradodecoxy titanium, tetrastearoxy titanium, tetrabutoxy titanium dimer, tetrakis(8-hydroxyoctoxy) titanium, titanium diisopropoxy-bis(2-ethyl-1,3-hexanediolate), titanium bis(2-ethylhexyloxy)bis(2-ethyl-1,3-hexanediolate), tetrakis(2-chloroethoxy) titanium, tetrakis(2-bromoethoxy) titanium, tetrakis(2-methoxyethoxy) titanium, tetrakis(2-ethoxyethoxy) titanium, butoxytrimethoxy titanium, dibutoxydimethoxy titanium, butoxytriethoxy titanium, dibutoxydiethoxy titanium, butoxytriisopropoxy titanium, dibutoxydiisopropoxy titanium, tetraphenoxybutane, tetrakis(o-chlorophenoxy) titanium, tetrakis(m-nitrophenoxy) titanium, tetrakis(p-methylphenoxy) titanium, tetrakis(trimethylsiloxy) titanium.

Titanium acylates can also be used: triisopropoxy titanium, triisopropoxy titanium methacrylate, diisopropoxy titanium dimethacrylate, isopropoxy titanium trimethacrylate, triisopropoxy titanium hexanoate, triisopropoxy titanium stearate, and the like.

The following compounds, for example, can be used as halogenated titanium catalysts: triisopropoxy titanium chloride, diisopropoxy titanium dichloride, isopropoxy titanium trichloride, triisopropoxy titanium bromide, triisopropoxy titanium fluoride, triethoxy titanium chloride, tributoxy titanium chloride.

Titanium chelate complexes can also be used: dimethoxy titanium bis(ethylacetoacetate), dimethoxy titanium bis(acetylacetonate), diethoxy titanium bis(ethylacetoacetate), diethoxy titanium bis(acetylacetonate), diisopropoxy titanium bis(ethylacetoacetate), diisopropoxy titanium bis(m-ethylacetoacetate), diisopropoxy titanium bis(t-butylacetoacetate), diisopropoxy titanium bis(methyl-3-oxo-4,4-dimethylhexanoate), diisopropoxy titanium bis(ethyl-3-oxo-4,4,4-trifluorobutanoate), diisopropoxy titanium bis(acetylacetonate), diisopropoxy titanium bis(2,2,6,6-tetramethyl-3,5-heptanedionate), di(n-butoxy) titanium bis(ethylacetoacetate), di(n-butoxy) titanium bis(acetylacetonate), diisobutoxy titanium bis(ethylacetoacetate), diisobutoxy titanium bis(acetylacetonate), di(t-butoxy) titanium bis(ethylacetoacetate), di(t-butoxy) titanium bis(acetylacetonate), di(2-ethylhexoxy) titanium bis(ethylacetoacetate), di(2-ethylhexoxy) titanium bis(acetylacetonate), bis(1-methoxy-2-propoxy) titanium bis(ethylacetoacetate), bis(3-oxo-2-butoxy) titanium bis(ethylacetoacetate), bis(3-diethylaminopropoxy) titanium bis(ethylacetoacetate), triisopropoxy titanium (ethylacetoacetate), triisopropoxy titanium (diethylmalonate), triisopropoxy titanium (allylacetoacetate), triisopropoxy titanium (methacryloxyethylacetoacetate), 1,2-dioxyethane titanium bis(ethylacetoacetate), 1,3-dioxypropane titanium bis(ethylacetoacetate), 2,4-dioxypentane titanium bis(ethylacetoacetate), 2,4-dimethyl-2,4-dioxypentane titanium bis(ethylacetoacetate), diisopropoxy titanium bis(triethanolaminate), tetrakis(ethylacetoacetato) titanium, tetrakis(acetylacetonato) titanium, bis(trimethylsiloxy) titanium bis(ethylacetoacetate), bis(trimethylsiloxy) titanium bis(acetylacetonate).

It is preferred to use the following titanium chelate complexes, because they are commercially obtainable and have a high catalytic activity: diethoxy titanium bis(ethylacetoacetate), diethoxy titanium bis(acetylacetonate), diisopropoxy titanium bis(ethylacetoacetate), diisopropoxy titanium bis(acetylacetonate), dibutoxy titanium bis(ethylacetoacetate), and dibutoxy titanium bis(acetylacetonate).

Diethoxy titanium bis(ethylacetoacetate), diisopropoxy titanium (ethylacetoacetate), and dibutoxy titanium bis(ethylacetoacetate) are particularly preferred; diisopropoxy titanium bis(ethylacetoacetate) is very particularly preferred.

The following titanium catalysts can also be used: isopropoxy titanium tris(dioctylphosphate), isopropoxy titanium tris(dodecylbenzylsulfonate), dihydroxy titanium bislactate.

Aluminum catalysts can also be used as curing catalysts, for example aluminum alkoxides

where $R^z$ denotes an organic group, preferably a substituted or unsubstituted hydrocarbon residue having 1 to 20 carbon atoms, and the three $R^z$ residues are identical or different.

In the case of the aluminum alkoxides as well, one or more of the alkoxy residues can again be replaced by acyloxy residues —OC(O)$R^z$.

It is also possible to use aluminum alkoxides in which one or more alkoxy residues are replaced by halogen groups.

Of the aluminum catalysts described, the pure aluminum alcoholates are preferred in view of their stability with respect to moisture and the curability of the mixtures to which they are added. Aluminum chelate complexes are also preferred.

The following compounds, for example, can be used as aluminum alkoxides: trimethoxy aluminum, triethoxy aluminum, triallyloxy aluminum, tri(n-propoxy) aluminum, triisopropoxy aluminum, tri(n-butoxy) aluminum, triisobutoxy aluminum, tri(sec-butoxy) aluminum, tri(t-butoxy) aluminum, tri(n-pentoxy) aluminum, tricyclopentoxy aluminum, trihexoxy aluminum, tricyclohexoxy aluminum, tribenzoxy aluminum, trioctoxy aluminum, tris(2-ethylhexoxy) aluminum, tridecoxy aluminum, tridodecoxy aluminum, tristearoxy aluminum, dimeric tributoxy aluminum, tris(8-hydroxyoctoxy) aluminum, isopropoxy aluminum bis(2-ethyl-1,3-hexandiolate), diisopropoxy aluminum (2-ethyl-1,3-hexanediolate), (2-ethylhexoxy) aluminum bis(2-ethyl-1,3-hexanediolate), bis(2-ethylhexyloxy) aluminum (2-ethyl-1,3-hexanediolate), tris(2-chloroethoxy) aluminum, tris(2-bromoethoxy) aluminum, tris(2-methoxyethoxy) aluminum, tris(2-ethoxyethoxy) aluminum, butoxydimethoxy aluminum, methoxydibutoxy aluminum, butoxydiethoxy aluminum, ethoxydibutoxy aluminum, butoxydiisopropoxy aluminum, isopropoxydibutoxy aluminum, triphenoxy aluminum, tris(o-chlorophenoxy) aluminum, tris(m-nitrophenoxy) aluminum, tris(p-methylphenoxy) aluminum.

Aluminum acylates, for example, can also be used: diisopropoxy aluminum acrylate, diisopropoxy aluminum methacrylate, isopropoxy aluminum dimethacrylate, diisopropoxy aluminum hexanoate, diisopropoxy aluminum stearate.

Aluminum halide compounds can also be used, for example diisopropoxy aluminum chloride, isopropoxy aluminum dichloride, diisopropoxy aluminum bromide, diisopropoxy aluminum fluoride, diethoxy aluminum chloride, dibutoxy aluminum chloride.

Aluminum chelate complexes can also be used as catalysts, for example methoxy aluminum bis(ethylacetoacetate), methoxy aluminum bis(acetylacetonate), ethoxy aluminum bis(ethylacetoacetate), ethoxy aluminum bis(acetylacetonate), isopropoxy aluminum bis(ethylacetoacetate), isopropoxy aluminum bis(methylacetoacetate), isopropoxy aluminum bis(t-butylacetoacetate), dimethoxy aluminum (ethylacetoacetate), dimethoxy aluminum (acetylacetonate), diethoxy aluminum (ethylacetoacetate), diethoxy aluminum (acetylacetonate), diisopropoxy aluminum (ethylacetoacetate), diisopropoxy aluminum (methylacetoacetate), diisopropoxy aluminum (t-butylacetoacetate), isopropoxy aluminum bis(methyl-3-oxo-4,4-dimethylhexanoate), isopropoxy aluminum bis(ethyl-3-oxo-4,4,4-trifluoropentanoate), isopropoxy aluminum bis(acetylacetonate), isopropoxy aluminum bis(2,2,6,6-tetramethyl-3,5-heptanedionate), n-butoxy aluminum bis(ethylacetoacetate), n-butoxy aluminum bis(acetylacetonate), isobutoxy aluminum bis(ethylacetoacetate), isobutoxy aluminum bis(acetylacetonate), t-butoxy aluminum bis(ethylacetoacetate), t-butoxy aluminum bis(acetylacetonate), 2-ethylhexoxy aluminum bis(ethylacetoacetate), 2-ethylhexoxy aluminum bis(acetylacetonate), 1,2-dioxyethane aluminum (ethylacetoacetate), 1,3-dimpropane aluminum (ethylacetoacetate), 2,4-dioxypentane aluminum (ethylacetoacetate), 2,4-dimethyl-2,4-dioxypentane aluminum (ethylacetoacetate), isopropoxy aluminum bis(triethanolaminate), aluminum tris(ethylacetoacetate), aluminum tris(acetylacetonate), aluminum (acetylacetonate)bis(ethylacetoacetate).

The following aluminum chelate complexes are used in preferred fashion as catalysts, because they are commercially obtainable and exhibit a high catalytic activity: ethoxy aluminum bis(ethylacetoacetate), ethoxy aluminum bis(acetylacetonate), isopropoxy aluminum bis(ethylacetoacetate), isopropoxy aluminum bis(acetylacetonate), butoxy aluminum bis(ethylacetoacetate), butoxy aluminum bis(acetylacetonate), dimethoxy aluminum ethylacetoacetate, dimethoxy aluminum acetylacetonate, diethoxy aluminum ethylacetoacetate, diethoxy aluminum acetylacetonate, diisopropoxy aluminum ethylacetoacetate, diisopropoxy aluminum methylacetoacetate, and diisopropoxy aluminum (t-butylacetoacetate).

Ethoxy aluminum bis(ethylacetoacetate), isopropoxy aluminum bis(ethylacetoacetate), butoxy aluminum bis(ethylacetoacetate), dimethoxy aluminum ethylacetoacetate, diethoxy aluminum ethylacetoacetate, and diisopropoxy aluminum ethylacetoacetate are particularly preferred.

Isopropoxy aluminum bis(ethylacetoacetate) and diisopropoxy aluminum ethylacetoacetate are very particularly preferred.

The following aluminum catalysts, for example, can also be used: bis(dioctylphosphato)isopropoxy aluminum, bis(dodecylbenzylsulfonato)isopropoxy aluminum, hydroxy aluminum bislactate.

The following are suitable as zirconium catalysts: tetramethoxy zirconium, tetraethoxy zirconium, tetraallyloxy zirconium, tetra-n-propoxy zirconium, tetraisopropoxy zirconium, tetra-n-butoxy zirconium, tetraisobutoxy zirconium, tetra-(2-butoxy) zirconium, tetra(t-butoxy) zirconium, tetrapentoxy(zirconium), tetracyclopentoxy zirconium, tetrahexoxy zirconium, tetracyclohexoxy zirconium, tetrabenzoxy zirconium, tetraoctoxy zirconium, tetrakis(2-ethylhexoxy) zirconium, tetradecoxy zirconium, tetradodecoxy zirconium, tetrastearoxy zirconium, tetrabutoxy zirconium dimer, tetrakis(8-hydroxyoctoxy) zirconium, zirconium diisopropoxy-bis(2-ethyl-1,3-hexanediolate), zirconium bis(2-ethylhexyloxy)bis(2-ethyl-1,3-hexanediolate), tetrakis(2-chloroethoxy) zirconium, tetrakis(2-bromoethoxy) zirconium, tetrakis(2-methoxyethoxy) zirconium, tetrakis(2-ethoxyethoxy) zirconium, butoxytrimethoxy zirconium, dibutoxydimethoxy zirconium, butoxytriethoxy zirconium, dibutoxydiethoxy zirconium, butoxitriisopropoxy zirconium, dibutoxydiisopropoxy zirconium, tetraphenoxybutane, tetrakis(o-chlorophenoxy) zirconium, tetrakis(m-nitrophenoxy) zirconium, tetrakis(p-methylphenoxy) zirconium, tetrakis(trimethylsiloxy) zirconium, diisopropoxy zirconium bis(ethylacetoacetate), diisopropoxy zirconium bis(acetylacetonate), dibutoxy zirconium bis(ethylacetoacetate), dibutoxy zirconium bis(acetylacetonate), triisopropoxy zirconium ethylacetoacetate, triisopropoxy zirconium acetylacetonate, tris(n-butoxy) zirconium ethylacetoacetate, tris(n-butoxy) zirconium acetylacetonate, isopropoxy zirconium tris(ethylacetoacetate), isopropoxy zirconium tris(acetylacetonate), n-butoxy zirconium tris(ethylacetoacetate), n-butoxy zirconium tris(acetylacetonate), n-butoxy zirconium (acetylacetonate)bis(ethylacetoacetate).

It is preferred to use, for example, diethoxy zirconium bis(ethylacetoacetate), diisopropoxy zirconium bis(ethylacetoacetate), dibutoxy zirconium bis(ethylacetoacetate), triispropoxy zirconium (ethylacetoacetate), tris(n-butoxy) zirconium (ethylacetoacetate), isopropoxy zirconium tris(ethylacetoacetate), n-butoxy zirconium tris(ethylacetoacetate), and n-butoxy zirconium (acetylacetonate)bis(ethylacetoacetate).

Very particularly preferably, diisopropoxy zirconium bis(ethylacetoacetate), triispropoxy zirconium (ethylacetoacetate), and isopropoxy zirconium tris(ethylacetoacetate) can be.

Zirconium acylates, for example, can also be used: triisopropoxy zirconium, triisopropoxy zirconium methacrylate, diisopropoxy zirconium dimethacrylate, isopropoxy zirconium trimethacrylate, triisopropoxy zirconium hexanoate, triisopropoxy zirconium stearate, and the like.

The following compounds can be used as halogenated zirconium catalysts: triisopropoxy zirconium chloride, diisopropoxy zirconium dichloride, isopropoxy zirconium trichloride, triisopropoxy zirconium bromide, triisopropoxy zirconium fluoride, triethoxy zirconium chloride, tributoxy zirconium chloride.

Zirconium chelate complexes can also be used: dimethoxy zirconium bis(ethylacetoacetate), dimethoxy zirconium bis(acetylacetonate), diethoxy zirconium bis(ethylacetoacetate), diethoxy zirconium bis(acetylacetonate), diisopropoxy zirconium bis(ethylacetoacetate), diisopropoxy zirconium bis(methylacetoacetate), diisopropoxy zirconium bis(t-butylacetoacetate), diisopropoxy zirconium bis(methyl-3-oxo-4,4-dimethylhexanoate), diisopropoxy zirconium bis(ethyl-3-oxo-4,4,4-trifluorobutanoate), diisopropoxy zirconium bis(acetylacetonate), diisopropoxy zirconium bis(2,2,6,6-tetramethyl-3,5-heptanedionate), di(n-butoxy) zirconium bis(ethylacetoacetate), di(n-butoxy) zirconium bis(acetylacetonate), diisobutoxy zirconium bis(ethylacetoacetate), diisobutoxy zirconium bis(acetylacetonate), di(t-butoxy) zirconium bis(ethylacetoacetate), di(t-butoxy) zirconium bis(acetylacetonate), di(2-ethylhexoxy) zirconium bis(ethylacetoacetate), di(2-ethylhexoxy) zirconium bis(acetylacetonate), bis(1-methoxy-2-propoxy) zirconium bis(ethylacetoacetate), bis(3-oxo-2-butoxy) zirconium bis(ethylacetoacetate), bis(3-diethylaminopropoxy) zirconium bis(ethylacetoacetate), triisopropoxy zirconium (ethylacetoacetate), triisopropoxy zirconium (diethylmalonate), triisopropoxy zirconium (allylacetoacetate), triisopropoxy zirconium (methacryloxyethylacetoacetate), 1,2-dioxyethane zirconium bis(ethylacetoacetate), 1,3-dioxypropane zirconium bis(ethylacetoacetate), 2,4-dioxypentane zirconium bis(ethylacetoacetate), 2,4-dimethyl-2,4-dioxypentane zirconium bis(ethylacetoacetate), diisopropoxy zirconium bis(triethanolaminate), tetrakis(ethylacetoacetato) zirconium, tetrakis(acetylacetonato) zirconium, bis(trimethylsiloxy) zirconium bis(ethylacetoacetate), bis(trimethylsiloxy) zirconium bis(acetylacetonate).

The following zirconium chelate complexes are preferred for use because they are commercially obtainable and have a high catalytic activity: diethoxy zirconium bis(ethylacetoacetate), diethoxy zirconium bis(acetylacetonate), diisopropoxy zirconium bis(ethylacetoacetate), diisopropoxy zirconium bis(acetylacetonate), dibutoxy zirconium bis(ethylacetoacetate) and dibutoxy zirconium bis(acetylacetonate).

Diethoxy zirconium bis(ethylacetoacetate), diisopropoxy zirconium (ethylacetoacetate), and dibutoxy zirconium bis(ethylacetoacetate) are particularly preferred; diisopropoxy zirconium bis(ethylacetoacetate) is very particularly preferred.

The following zirconium catalysts can also be used: isopropoxy zirconium tris(dioctylphosphate), isopropoxy zirconium tris(dodecyl benzyl sulfonate), dihydroxy zirconium bislactate.

Carboxylic acid salts of metals, or a mixture of multiple such salts, can furthermore be employed as curing catalysts, these being selected from the carboxylates of the following metals: calcium, vanadium, iron, titanium, potassium, barium, manganese, nickel, cobalt, and/or zirconium.

Of the carboxylates, the calcium, vanadium, iron, titanium, potassium, barium, manganese, and zirconium carboxylates are preferred because they have a high activity.

Calcium, vanadium, iron, titanium, and zirconium carboxylates are particularly preferred. Iron and titanium carboxylates are very particularly preferred.

The following compounds, for example, can be used: iron (II) (2-ethylhexanoate), iron(III) (2-ethylhexanoate), titanium(IV) (2-ethylhexanoate), vanadium(III) (2-ethylhexanoate), calcium(II) (2-ethylhexanoate), potassium 2-ethylhexanoate, barium(II) (2-ethylhexanoate), manganese (II) (2-ethylhexanoate), nickel(II) (2-ethylhexanoate), cobalt (II) (2-ethylhexanoate), zirconium(IV) (2-ethylhexanoate), iron(II) neodecanoate, iron(III) neodecanoate, titanium(IV) neodecanoate, vanadium(III) neodecanoate, calcium(II) neodecanoate, potassium neodecanoate, barium(II) neodecanoate, zirconium(IV) neodecanoate, iron(II) oleate, iron (III) oleate, titanium tetraoleate, vanadium(III) oleate, calcium(II) oleate, potassium oleate, barium(II) oleate, manganese(II) oleate, nickel(II) oleate, cobalt(II) oleate, zirconium(IV) oleate, iron(II) naphthenate, iron(III) naphthenate, titanium(IV) naphthenate, vanadium(II) naphthenate, calcium dinaphthenate, potassium naphthenate, barium dinaphthenate, manganese dinaphthenate, nickel dinaphthenate, cobalt dinaphthenate, zirconium(IV) naphthenate. In terms of catalytic activity, iron(II) (2-ethylhexanoate, iron(III) 2-ethylhexanoate, titanium(IV) 2-ethylhexanoate, iron(II) neodecanoate, iron(III) neodecanoate, titanium(IV) neodecanoate, iron(II) oleate, iron(III) oleate, titanium(IV) oleate, iron(II) naphthenate, iron(III) naphthenate, and titan(IV) naphthenate are preferred, and iron(III) 2-ethylhexanoate, iron(III) neodecanoate, iron(III) oleate, and iron(III)naphthenate are particularly preferred.

The following are preferred in view of the nonoccurrence of discolorations: titanium(IV) 2-ethylhexanoate, calcium(II) 2-ethylhexanoate, potassium 2-ethylhexanoate, barium(II) 2-ethylhexanoate, zirconium(IV) 2-ethylhexanoate, titanium (IV) neodecanoate, calcium(II) neodecanoate, potassium neodecanoate, barium(II) neodecanoate, zirconium(IV) neodecanoate, titanium(IV) oleate, calcium(II) oleate, potassium oleate, barium(II) oleate, zirconium(IV) oleate, titanium(IV) naphthenate, calcium(II) naphthenate, potassium naphthenate, barium(II) naphthenate, and zirconium(IV) naphthenate.

The calcium carboxylates, vanadium carboxylates, iron carboxylates, titanium carboxylates, potassium carboxylates, barium carboxylates, manganese carboxylates, nickel carboxylates, cobalt carboxylates, and zirconium carboxylates can be used individually or as a mixture of several catalysts from one or more of the aforementioned groups. These metal carboxylates can furthermore be used in conjunction with tin carboxylates, lead carboxylates, bismuth carboxylates, and cerium carboxylates.

The catalyst, preferably mixtures of several catalysts, are used in a quantity from 0.01 to approximately 5 wt %, based on the total weight of the preparation.

The preparation according to the present invention can moreover contain up to approximately 20 wt % of usual adhesion promoters (tackifiers). Suitable adhesion promoters are, for example, resins, terpene oligomers, coumaron/indene resins, aliphatic petrochemical resins, and modified phenol resins. Suitable in the context of the present invention as adhesion promoters are, for example, hydrocarbon resins such as those obtained by the polymerization of terpenes, chiefly—or —pinenes, dipentenes, or limonenes. Polymerization of these monomers is generally performed cationically, with initiation using Friedel-Crafts catalysts. Also included among the terpene resins, for example, are copolymers of terpenes and of other monomers, for example styrene, α-methylstyrene, isoprene, and the like. The aforesaid resins are utilized, for example, as adhesion promoters for contact adhesives and coating materials. Also suitable are the terpene-phenol resins that are produced by acid-catalyzed addition of phenols to terpenes or colophon. Terpene-phenol resins are soluble in most organic solvents and oils, and are miscible with other resins, waxes, and rubber. Also suitable in the context of the present invention as an additive are the colophon resins and derivatives thereof, for example esters or alcohols thereof.

Furthermore, the preparation according to the present invention can also contain up to approximately 7 wt %, in particular up to approximately 5 wt %, antioxidants.

The preparation according to the present invention can contain up to approximately 2 wt %, by preference approximately 1 wt %, UV stabilizers. The so-called hindered amine light stabilizers (HALS) are particularly suitable as UV stabilizers. It is preferred in the context of the present invention if a UV stabilizer that carries a silyl group, and that is incorporated into the end product upon crosslinking or curing, is used. The products Lowillite 75, Lowillite 77 (Great Lakes company, USA) are particularly suitable for this purpose. Benzotriazoles, benzophenones, benzoates, cyanoacrylates, acrylates, sterically hindered phenols, phosphorus, and/or sulfur can also be added.

It is often useful to further stabilize the preparations according to the present invention with regard to moisture penetration by means of drying agents, in order to enhance shelf life even further.

Such improvement in shelf life can be achieved, for example, with the use of drying agents. Suitable as drying agents are all compounds that react with water to form a group that is inert with respect to the reactive groups present in the preparation, and in that context experience as little change as possible in their molecular weight. In addition, the reactivity of the drying agent with respect to moisture that has penetrated into the preparation must be greater than the reactivity of the terminal groups of the silyl-group-carrying polymer according to the present invention that is present in the preparation.

Isocyanates, for example, are suitable as drying agents.

It is also conceivable to use isocyanatosilanes in slight excess, for example at a ratio of 1.3:1, as a compound having functional group D. If excess isocyanatosilane from reaction of the polymer with compound (III) or (IV) remains in the preparation, it can serve directly as a drying agent.

Advantageously, however, silanes are used as a drying agent, for example vinylsilanes such as 3-vinylpropyltriethoxysilane, oximosilanes such as methyl-O,O',O'''-butan-2-onetrioximosilane or O,O','', O'''-butan-2-onetetraoximosilane (CAS nos. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. The use of methyl-, ethyl- or vinyltrimethoxysilane, tetramethyl- or -ethylethoxysilane is, however, also possible. Vinyltrimethoxysilane and tetraethoxysilane are particularly preferred here in terms of efficiency and cost.

The aforementioned reactive diluents are also suitable as drying agents, provided they have a molecular weight ($M_n$) of less than approximately 5000 g/mol and possess terminal groups whose reactivity with respect to moisture that has penetrated is at least as great as, preferably greater than, the reactivity of the reactive groups of the silyl-group-carrying polymer according to the present invention.

Lastly, alkyl orthoformates or alkyl orthoacetates can also be used as drying agents, for example methyl or ethyl orthoformate, methyl or ethyl orthoacetate.

The adhesives and sealants according to the present invention generally contain approximately 0 to approximately 6 wt % drying agent.

The preparation according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be used. Aluminum powder is also suitable as a filler.

The pyrogenic and/or precipitated silicic acids advantageously have a BET surface area from 10 to 90 m$^2$/g. When they are used they do not produce any additional increase in the viscosity of the preparation according to the present invention, but do contribute to strengthening of the preparation once cured.

It is likewise conceivable to use pyrogenic and/or precipitated silicic acids having a larger BET surface area, advantageous 100 to 250 m$^2$/g, in particular 110 to 170 m$^2$/g, as a filler. Because of the greater BET surface area, the same effect (e.g. strengthening of the preparation once cured) can be achieved with a smaller weight proportion of silicic acid. It is thus possible to use further substances in order to improve the preparation according to the present invention in terms of other requirements.

Also suitable as fillers are hollow spheres having a mineral shell or a plastic shell. These can be, for example, hollow glass spheres that are obtainable commercially under the trade names Glass Bubbles®. Plastic-based hollow spheres, for example Expancel® or Dualite®, are described e.g. in EP 0 520 426 B1. They are made up of inorganic or organic substances and each have a diameter of 1 mm or less, preferably 500 µm or less.

Fillers that impart thixotropy to the preparations are preferred for many applications. Such fillers are also described as "rheological adjuvants," e.g. hydrogenated castor oil, fatty acid amides, or swellable plastics such as PVC. In order to be readily squeezable out of a suitable metering apparatus (e.g. a tube), such preparations possess a viscosity from 3000 to 15,000, by preference 40,000 to 80,000 mPas, or also 50,000 to 60,000 mPas.

The fillers are preferably used in a quantity from 1 to 80 wt %, based on the total weight of the preparation.

The preparation according to the present invention is manufactured in accordance with known methods, by intimate mixing of the constituents in suitable dispersing equipment, e.g. in a high-speed mixer.

A further subject of the present invention relates to use of the composition according to the present invention, or of the preparation according to the present invention, as an adhesive, sealing compound, surface filling compound, and for the manufacture of shaped parts. A further area of application of the compositions according to the present invention is use as a surface filling compound for anchors, holes, and cracks.

The compositions and preparations according to the present invention are therefore suitable for adhesive bonding of plastics, metals, glass, ceramic, wood, wood materials, paper, paper materials, rubber, and textiles, for adhesive bonding of floors, and for sealing structural parts, windows, wall and floor coverings, and gaps in general. The materials can in each case be adhesively bonded to themselves or arbitrarily to one another.

A preferred embodiment of the preparation according to the present invention can contain:

5 to 50 wt %, preferably 10 to 40 wt %, of one or more compounds of the compositions according to the present invention, 0 to 30 wt %, less than 20 wt %, particularly preferably less than 10 wt % plasticizer, 0 to 80 wt %, preferably 20 to 60 wt %, particularly preferably 30 to 55 wt % fillers.

The embodiment can moreover contain further adjuvants.

The constituents add up in their entirety to 100 wt %; the sum of only the principal constituents listed above need not add up to 100 wt %.

The invention is explained in further detail below with reference to exemplifying embodiments and manufacturing instructions.

Examples and Manufacturing Instructions

Preparation of Isocyanatosilanes

I. Preparation of methyl(dimethmmethylsilylpropyl) carbamate

In a two-liter three-necked flask having a KPG stirrer, a temperature sensor, and a 500 ml dropping funnel, 8.83 g of a sodium methylate solution (30 wt %) is dissolved in 500 g anhydrous dimethyl carbonate, and 630 g 3-aminopropylmethyldimethoxysilane is then slowly dripped in. The temperature in the reactor is held below T=30° C. by cooling.

After the amine has been added, the mixture is cooled for a further three hours. Once the amine number has decreased below the limit of 10, the mixture is adjusted to a pH of 7 using maleic acid anhydride.

The solvent is then removed by distillation, and the raw product is purified by distillation. The boiling point of the product is approx. T=117° C. (p=3.8 mbar).

1. Preparation of 3-isocyanatopropylmethyldimethoxysilane (A suitable method is described, for example, in EP 0 870 769 A2 of Apr. 2, 1998.)

Approx. 200 ml rotary vane pump oil (a B oil of the Vacuubrand company) is placed in a 1-liter three-necked flask having a temperature sensor, a distillation column, and a 500 ml dropping funnel.

The oil is heated for t=1 h at p=0.2 mbar to T=250° in order to purge it of volatile constituents. A weighed 110.5 g methyl (dimethoxymethylsilylpropyl) carbamate is then placed into the dropping funnel, and the oil is heated at p=38 mbar to T=315° C. The carbamate is then added very slowly, care being taken that only a moderate reflux emerges from the distillation column. In addition, the temperature should not drop below 300° C. during the entire inflow time.

The head temperature of the distillation column is by preference between 93 and 103° C. Yield is up to 90% by weight.

EXAMPLES

Polymer I

Exclusively γ-dimethoxymethylsilyl Functionalization 328 g (18 mmol) polypropylene glycol 18000 (OH no.=6.2) (Acclaim 18200 N, Bayer MaterialScience AG, 51368 Leverkusen, Germany) is dried under vacuum at 80° C. in a 500 ml three-necked flask. 0.07 g dibutyltin dilaurate and 9.1 g (44 mmol) 3-isocyanatopropylmethyldimethoxysilane are then added under a nitrogen atmosphere at 80° C., and stirred for one hour at 80° C.

The resulting prepolymer mixture is cooled, and 7.0 g N-trimethoxysilylmethyl-O-methyl carbamate (Geniosil XL 63, CAS no.: [23432-64-6], Wacker Chemie AG, D-81737 Munich, Germany) and 5.3 g of a mixture (Tinuvin 765, Ciba Spec. Chem., D-68623 Lampertheim, Germany) of 70 wt % bis(1,2,2,6,6-pentamethyl-4-piperidyl) sebacate and 30 wt % methyl-1,2,2,6,6-pentamethyl-4-piperidyl sebacate is then added to it.

The product is stored in moisture-tight fashion under a nitrogen atmosphere in a glass vessel before being further processed, in accordance with the general instructions, to yield a curable composition.

Polymer II 80 wt % γ-dimethoxy, 20 wt % α-dimethoxymethylsilyl Functionalization 328 g (18 mmol) propylene glycol 18000 (OH no.=6.2) is dried under vacuum at 80° C. in a 500 ml three-necked flask. 0.07 g dibutyltin dilaurate, 7.0 g (35 mmol) 3-isocyanatopropylmethyldimethoxysilane, and 1.6 g (9 mmol) 1-isocyanatomethylmethyldimethoxysilane (Geniosil XL 42, CAS no.: [406679-89-8], Wacker Chemie AG, D-81737 Munich, Germany) are then added under a nitrogen atmosphere at 80° C., and stirred for one hour at 80° C.

The resulting prepolymer mixture is cooled, and 7.0 g Geniosil XL 63 and 5.3 g of a mixture (Tinuvin 765) of 70 wt % bis(1,2,2,6,6-pentamethyl-4-piperidyl) sebacate and 30 wt % methyl-1,2,2,6,6-pentamethyl-4-piperidyl sebacate is then added to it.

The product is stored in moisture-tight fashion under a nitrogen atmosphere in a glass vessel before being further processed, in accordance with the general instructions, to yield a curable composition.

Polymer III 50 wt % γ-dimethoxy, 50 wt % α-dimethoxymethylsilyl Functionalization 330 g (18 mmol) polypropylene glycol 18000 (OH no.=6.2) is dried under vacuum at 80° C. in a 500 ml three-necked flask. 0.07 g dibutyltin dilaurate, 4.4 g (22 mmol) 3-isocyanatopropylmethyldimethoxysilane, and 4.1 g (22 mmol) 1-isocyanatomethylmethyldimethoxysilane (Geniosil XL 42) are then added under a nitrogen atmosphere at 80° C., and stirred for one hour at 80° C.

The resulting prepolymer mixture is cooled, and 7.0 g Geniosil XL 63 and 5.3 g of a mixture (Tinuvin 765) of 70 wt % bis(1,2,2,6,6-pentamethyl-4-piperidyl) sebacate and 30 wt % methyl-1,2,2,6,6-pentamethyl-4-piperidyl sebacate is then added to it.

The product is stored in moisture-tight fashion under a nitrogen atmosphere in a glass vessel before being further processed, in accordance with the general instructions, to yield a curable composition.

Polymer IV 20 wt % γ-dimethoxy, 80 wt % α-dimethoxymethylsilyl Functionalization 330 g (18 mmol) polypropylene glycol 18000 (OH no.=6.2) is dried under vacuum at 80° C. in a 500 ml three-necked flask. 0.07 g dibutyltin dilaurate, 1.7 g (9 mmol) 3-isocyanatopropylmethyldimethoxysilane, and 6.5 g (35 mmol) 1-isocyanatomethylmethyldimethoxysilane (Geniosil XL 42) are then added under a nitrogen atmosphere at 80° C., and stirred for one hour at 80° C.

The resulting prepolymer mixture is cooled, and 7.0 g Geniosil XL 63 and 5.3 g of a mixture (Tinuvin 765) of 70 wt % bis(1,2,2,6,6-pentamethyl-4-piperidyl) sebacate and 30 wt % methyl-1,2,2,6,6-pentamethyl-4-piperidyl sebacate is then added to it.

The product is stored in moisture-tight fashion under a nitrogen atmosphere in a glass vessel before being further processed, in accordance with the general instructions, to yield a curable composition.

Polymer V

Exclusively α-dimethoxymethylsilyl Functionalization 328 g (18 mmol) polypropylene glycol 18000 (OH no.=6.2) is dried under vacuum at 80° C. in a 500 ml three-necked flask. 0.07 g dibutyltin dilaurate and 8.1 g (44 mmol) 1-isocyanatomethylmethyldimethoxysilane (Geniosil XL 42) are then added under a nitrogen atmosphere at 80° C., and stirred for one hour at 80° C.

The resulting prepolymer mixture is cooled, and 7.0 g Geniosil XL 63 and 5.3 g of a mixture (Tinuvin 765) of 70 wt % bis(1,2,2,6,6-pentamethyl-4-piperidyl) sebacate and 30 wt % methyl-1,2,2,6,6-pentamethyl-4-piperidyl sebacate is then added to it.

The product is stored in moisture-tight fashion under a nitrogen atmosphere in a glass vessel before being further processed, in accordance with the general instructions, to yield a curable composition.

Polymer V1

Comparison Example (Only γ-trimethoxymethylsilyl Functionalization)

328 g (18 mmol) polypropylene glycol 18000 (OH no.=6.2) is dried under vacuum at 80° C. in a 500 ml three-necked flask. 0.07 g dibutyltin dilaurate and 8.9 g (44 mmol) 3-isocyanatopropyltrimethoxysilane (Geniosil GF 40) are then added under a nitrogen atmosphere at 80° C., and stirred for one hour at 80° C.

The resulting prepolymer mixture is cooled, and 7.0 g Geniosil XL 63 and 5.3 g of a mixture (Tinuvin 765) of 70 wt % bis(1,2,2,6,6-pentamethyl-4-piperidyl) sebacate and 30 wt % methyl-1,2,2,6,6-pentamethyl-4-piperidyl sebacate is then added to it.

The product is stored in moisture-tight fashion under a nitrogen atmosphere in a glass vessel before being further processed, in accordance with the general instructions, to yield a curable composition.

General Instructions for Manufacturing the Curable Compositions According to the Present Invention:

25 wt % of the polymer mixture manufactured in the Examples is then intimately combined with 20 wt % diisoundecyl phthalate in an agitator, using a SpeedMixer for 30 seconds. Into this mixture, 45 wt % precipitated calcium carbonate (50% each Socal U1S2 and Omya BLP3), 3.35 wt % stabilized titanium dioxide of the rutile type (Kronos 2056), 1.5 wt % vinyltrimethoxysilane (Wacker Geniosil XL10), 0.95 wt % 3-aminopropyltrimethoxysilane (Wacker Geniosil GF96), and 0.05 wt % dibutyltin laurate are then introduced, and the resulting mix is intimately combined for 30 s in a SpeedMixer.

Test Conditions 1 wt % N-aminoethyl-3-aminopropyltrimethoxysilane (Geniosil GF40, Wacker Chemie AG) and 0.2 wt % Metatin 740 were added to each of the polymers. The skinover time (SOT) and time required for a tack-free layer to form (tack-free time, TFT) were determined for these mixtures.

The aforementioned mixtures were also applied, at a layer thickness of 2 mm, onto glass plates over which polyether film had been stretched. After 7 days of storage (23° C., 50% relative humidity), test articles (S2 dogbones) were punched out of these films and mechanical data (moduli, elongation, rebound capability) were determined per DIN EN 27389 and DIN EN 28339.

Evaluation

It may be gathered from the results in Table 1 that the extensibility of gap-sealing compounds having a physical mixture of differently functionalized silane-crosslinking polymers (VI, VII) in equal parts (VI) is better than that of those that contain only one silane-crosslinking polymer (I, V).

Considerably shorter curing times were observed for the examples according to the present invention (II to VII) than for the comparison formulation (Example V1). Gap-sealing compounds according to Examples (II) to (IV) exhibit particularly high extensibility values.

Example (III) exhibits both very high extensibility and also high fracture and breakage strength, and thus a particularly advantageous combination of properties.

$$-A_m-K^1-SiR^1XY \qquad (I),$$

$$-A_m-K^2-SiR^2XY \qquad (II),$$

in which
- A denotes a divalent bonding group,
- one of $K^1$ or $K^2$ denotes $-CH_2-$ and the other of $K^1$ or $K^2$ denotes $-(CH_2)_3-$,
- X, Y, mutually independently, denote a hydroxy group or a hydrolyzable group,
- $R^1$, $R^2$, mutually independently, denote a hydrocarbon residue having 1 to 20 carbon atoms, and
- m assumes the values 0 or 1.

2. The composition according to claim 1, wherein X and Y each denote a hydrolyzable group selected from —Cl, —O—C(=O)$R^3$, —O$R^3$, where $R^3$ denotes a hydrocarbon residue having 1 to 20 carbon atoms.

3. The composition according to claim 2, wherein $R^3$ denotes $-CH_3$ or $-C_2H_5$.

4. The composition according to claim 1, wherein $R^1$ and $R^2$, mutually independently, denote $-CH_3$ or $-C_2H_5$.

5. The composition according to claim 1, wherein
a) X and Y, and/or
b) $R^1$ and $R^2$
are identical.

6. The composition according to claim 1, wherein the divalent bonding group A denotes an amide, carbamate, urea, urethane, imino, carboxy, carbonate, thio, mercapto, or sulfonate group, or an oxygen atom.

7. The composition according to claim 1, wherein the molecular weight $M_n$ of the polymer framework is between 3000 and 50,000 g/mol.

TABLE 1

| Gap-sealing compounds | | | | | | | | |
|---|---|---|---|---|---|---|---|---|
| | Polymer no. | | | | | | | |
| | V1 | I | II | III | IV | V | VI | VII |
| Polymer framework | PPG 18000 | PPG 18000 | PPG 18000 | PPG 18000 | PPG 18000 | PPG 18000 | PPG 18000 | PPG 18000 |
| -γ-dimethoxysilyl terminal groups* (%) | — | 100 | 80 | 50 | 20 | — | 50 | 20 |
| α-dimethoxysilyl terminal groups* (%) | — | — | 20 | 50 | 80 | 100 | 50 | 80 |
| -γ-trimethoxysilyl terminal groups* (%) | 100 | — | — | — | — | — | — | — |
| Viscosity (mPa · s/ 23° C./Sp. 7/50 rpm) | ≈30,000 | 25,760 | 28,480 | 30,640 | 32,960 | 32,000 | n.d. | n.d. |
| Fracture strength (N/mm²) | 1.08 | X | 0.48 | 0.89 | 1.03 | 0.95 | 1.03 | 1.10 |
| Elongation (%) | 215% | X | 506% | 468% | 454% | 332% | 265% | 205% |
| E-50 (N/mm²) | 0.58 | X | 0.10 | 0.18 | 0.25 | 0.31 | 0.43 | 0.46 |
| E-100 (N/mm²) | 0.74 | X | 0.17 | 0.30 | 0.37 | 0.45 | 0.60 | 0.65 |

*Based on the functional groups (terminal groups) of the polymer framework
n.d. = not determined
X = No measurement possible because curing was not complete after 7 days
E-50 and E-100 denote the moduli of elasticity at a test specimen elongation of 50 and 100%, respectively.

The invention claimed is:

1. A curable composition encompassing a polymer P comprising a polymer framework selected from at least one of polyethylene oxide, polypropylene oxide and copolymers thereof and having at least two terminal groups, at least one group independently selected from the following formula (I), and at least one group independently selected from the following formula (II)

8. A preparation containing a composition according to claim 1.

9. The preparation according to claim 8, wherein the preparation further contains at least one compound selected from the group encompassing plasticizers, stabilizers, antioxidants, catalysts, fillers, reactive diluents, drying agents, adhesion promoters, and UV stabilizers, rheological adjuvants, solvents.

10. An adhesive or sealant comprising the composition of claim 1.

\* \* \* \* \*